May 28, 1963 I. JEPSON 3,091,226
COMBINED ENGINE SHROUD AND FUEL RESERVOIR
Filed Nov. 2, 1960
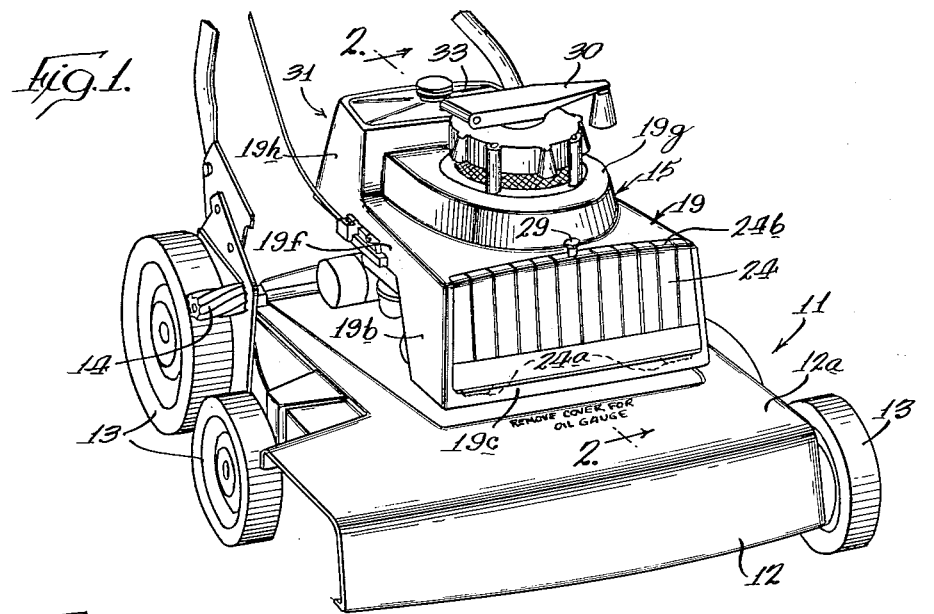
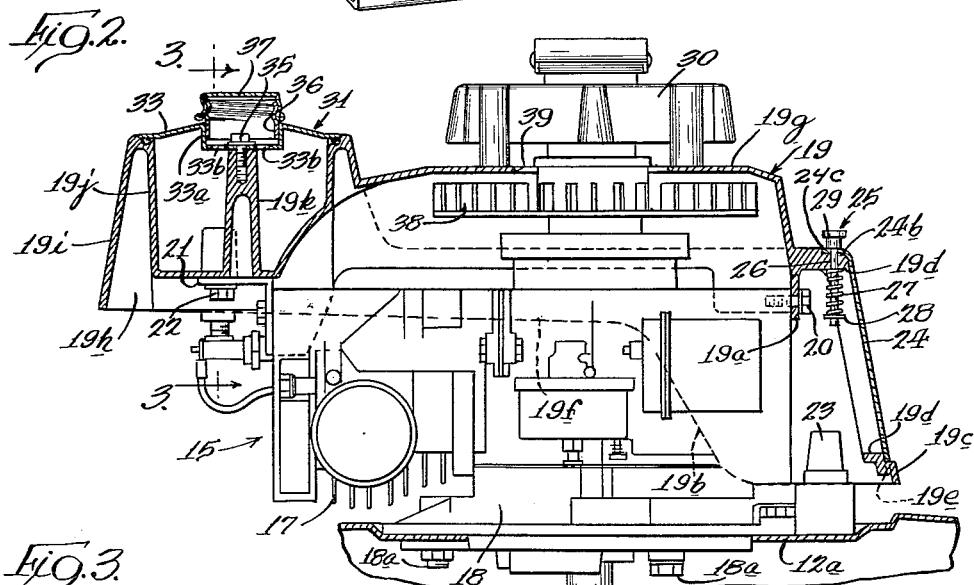
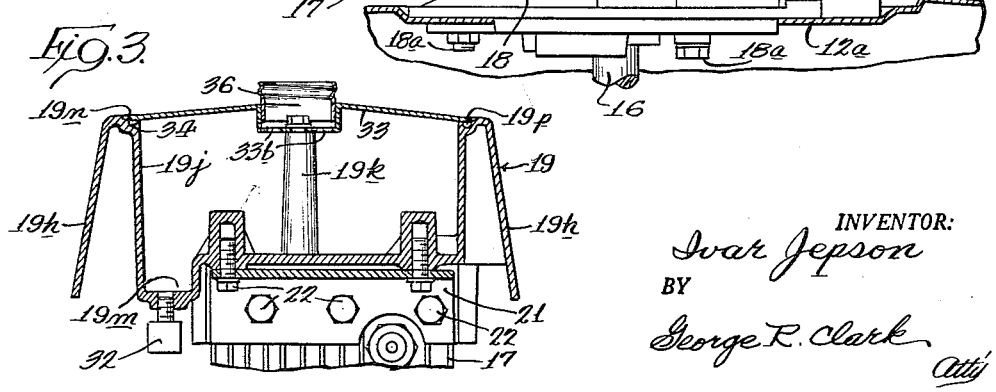
INVENTOR:
Ivar Jepson
BY
George R. Clark
Atty

United States Patent Office 3,091,226
Patented May 28, 1963

3,091,226
COMBINED ENGINE SHROUD AND FUEL RESERVOIR
Ivar Jepson, Oak Park, Ill., assignor to Sunbeam Corporation, Chicago, Ill., a corporation of Illinois
Filed Nov. 2, 1960, Ser. No. 66,864
9 Claims. (Cl. 123—41.65)

This invention relates generally to gasoline tanks or fuel reservoirs for internal combustion engines and more particularly to a gasoline tank formed integrally with the shroud for the engine.

While the instant invention has more general application, it is described as applied to an engine employed to drive a lawn mower. The development of the power lawn mower has been characterized by concentration on mechanical and functional features rather than the design and appearance. In an effort to achieve a desired function at the lowest possible cost, the engines for these lawn mowers have also been functional in appearance including little or no decorative or protective means to enclose the parts of the engine. Conventionally, these engines are air cooled having the single cylinder secured to the crankcase and the carburetor and exhaust muffler mounted conveniently thereon. The engine including these parts was merely bolted to the lawn mower housing with all parts exposed to view. The gasoline tank generally took the form of a sheet metal container secured by brackets to the body of the engine.

Prior art engines which included shrouds or housings merely enclosed the above-mentioned elements of the engine within a plastic or sheet metal box. Such arrangements were characterized by their high vibration noises caused by the sounding board action produced in the walls of the shroud whereby the engine noise would be greatly amplified. In addition, it was found to be difficult to mount the shroud on the engine without a substantial amount of vibration being transmitted from the engine through the mounting means to the shroud thereby adding to the noise produced by the engine. Since the noise produced by these small motors with inadequate exhaust mufflers was already considered objectionable by most users, the engine shrouds which further increased the noise were not widely used.

There was, however, a recognized need for a housing or shroud of some type to enclose the engine, but because of cost and the noise considerations mentioned above, it was thought to be impractical. Since the engine shroud has been rejected in many applications because of both noise and cost considerations, it was thought that it must be integrated with other parts of the engine if economies were to be realized which would make an engine shroud desirable in these applications.

It is, therefore, an object of the present invention to provide an improved shroud for an internal combustion engine.

It is a further object of the present invention to provide an engine shroud which is integrated with part of the engine to achieve improved operation and lower cost of manufacture.

It is a further object of the present invention to provide an improved gasoline tank for an internal combustion engine.

It is a further object of the present invention to provide a combined gasoline tank and shroud for an internal combustion engine.

It is an additional object of the present invention to provide an integral one-piece housing for an engine having the gasoline reservoir formed as a part thereof.

It is a further object of the invention to provide a die cast engine shroud having a cup-shaped reservoir formed therein and a plate-like closure member secured thereto to complete the gasoline tank for the engine.

Other objects and advantages will be apparent from the following description and the accompanying drawings in which:

FIGURE 1 is a perspective view of a lawn mower having an engine embodying the invention;

FIGURE 2 is a side view of the engine showing the combined gasoline tank and shroud and the mower housing sectioned along line 2—2 of FIGURE 1; and FIGURE 3 is a sectional view of the combined gasoline tank and engine shroud taken along line 3—3 of FIGURE 2 with the closure for the tank removed.

Briefly, the instant invention relates to a combined shroud and gasoline tank or fuel reservoir for an internal combustion engine. A one-piece die cast member is utilized to provide a rigid, vibration free decorative enclosure for the engine. An integral depression or recess in the die casting forms part of the gasoline reservoir which is completely closed by means of a plate member secured across the mouth of the recess. The means for securing the plate member to the die casting is positioned within the filling opening for the gasoline tank so that it may be readily assembled thereto while, at the same time, lying inside of the tank when the cap or closure is applied to the filling opening. This arrangement avoids any possibility of gasoline leakage in the area of the assembly means.

Referring to the drawings, the invention is shown in a preferred embodiment as applied to an internal combustion engine drive for a rotary lawn mower of the type disclosed and claimed in copending United States patent application of Etchison G. Lill No. 835,464, filed February 24, 1959, now Patent No. 3,035,385, issued May 22, 1962, and assigned to the same assignee as the instant application. The rotary lawn mower designated generally by reference number 11 includes a housing 12 which is supported for movement across a lawn by means of wheels 13. A wheel driving shaft 14 is shown in driving engagement with one of the rear wheels of the mower. The rotation of shaft 14 serves to rotate the rear wheels and propel the mower in the manner disclosed in the above-cited Lill application.

To propel the mower 11 and to drive the rotary cutting blade (not shown) which is mounted within the housing 12, an internal combustion engine 15 is mounted on the upper surface or deck 12a of the mower housing 12. The engine is of a well-known low horsepower variety having a single horizontally disposed piston which reciprocates within the air cooled cylinder 17. A vertically extending crankshaft 16 is supported and partially enclosed by a crankcase 18 which includes means 18a for rigidly securing the engine to the deck 12a. The various other parts of the engine, other than the gasoline tank and shroud are conventional and, forming no part of the invention, will not be described.

Secured to the body of the engine 15 and completely covering it is a die cast shroud or engine housing 19. The front of the shroud 19 is rigidly attached to the engine crankcase by means of bolts 20 which extend through flange 19a into threaded engagement with the crankcase 18. The mounting flange 19a is cast integrally with the shroud 19. The rearwardly extending portion of the shroud 19 is rigidly secured to the head end of the cylinder 17 by means of an angle bracket 21. Bolts 22 extend through holes in the bracket 21 into threaded engagement with the cylinder 17 and the shroud 19. By utilizing an aluminum die casting for the shroud 19, a rugged, sound deadening means has been provided to enclose the engine 16. Sheet metal or plastic guards secured in this manner to such an engine have been found to be noisy and to lack the strength and rigidity necessary to withstand the severe vibration conditions.

The die cast shroud 19 takes the form of an inverted cup-shaped member with depending side walls around the periphery thereof. In the area adjacent the crankcase 18, there are provided side walls 19b and front wall 19c which extend from the top of the shroud to a position close to the deck 12a of the mower as may be best seen in FIG. 2. To permit access to the crankcase 18 for the purpose of removing threaded plug 23 which closes the oil filling opening and for pouring oil therein, the front wall 19c of the shroud is almost completely cut away and formed with a large rectangular opening 19d therein. To complete the decorative housing for the crankcase portion of the engine, a cover plate 24 is received within the opening 19d.

The plate 24 is provided with assembly means at the upper and lower edges thereof to removably secure it in place in opening 19d. At the lower edge of the plate 24 there are provided a pair of protuberances or tabs 24a which are received within corresponding recesses 19e cast integrally in the shroud 19. When it is desired to remove the front cover plate 24, the top of the plate is moved forwardly slightly by pivoting the plate about the tabs 24a. The plate may then be moved upwardly and completely disengaged from the shroud 19 providing free access to the oil fill opening and other parts of the engine positioned beneath the shroud 19.

To retain the upper edge of the front cover plate 24 in engagement with the shroud 19, a latch 25 is utilized. The latch 25 includes a rod 26 which is mounted vertically for axial movement in a hole in the front edge of shroud 19, as may best be seen in FIG. 2. The upper portion of the cover plate 24 is provided with a flange portion 24b which extends rearwardly and blends smoothly with the adjacent portion of the shroud 19. At the midpoint of the flange 24b a slot 24c is formed in which the latch rod 26 is received.

The latch rod 26 is biased downwardly into locking engagement with the cover plate 24 by means of a helical spring 27 which is received on the lower end of rod 26. The upper end of the spring 27 engages the shroud 19 and biases the rod downwardly through the engagement of the lower end of the spring with a spring clip 28 which is received on the lower end of the rod 26. The upper end of the latch rod 26 is formed with an enlargement 29 which may be grasped by the operator to draw the latch rod upwardly to its disengaged position. As may be best seen in FIG. 2 the spring 27 biases the latch rod 26 downwardly whereupon the enlargement 29 engages the flange 24b of the cover plate and retains the cover plate assembled to the shroud 19. When it is necessary to remove the cover plate, the latch rod 26 is merely drawn upwardly until the cover plate may be pivoted forwardly, disengaging the slot 24c of the cover plate 24 from the rod 26. This removable arrangement of the cover plate provides a simple, inexpensive means for completing the decorative enclosure for the engine while still permitting easy access to the functional parts of the engine.

Whenever an internal combustion engine is placed in an enclosure, temperature problems must be considered since any restriction in the circulation of the cooling media would tend to cause the engine to overheat. The shroud 19 has, therefore, been limited so as to only partially enclose the engine 15 to assure adequate air circulation as well as to permit access to various parts for servicing and the like. As is conventional in air cooled engines, the engine 15 is provided with a centrifugal fan 38 which is mounted on the upper end of crankshaft 16 beneath the shroud 19. The fan 38 draws air downwardly through an opening 39 in the shroud and forces it out radially. The shroud 19 serves to direct the air circulated by the fan 38 rearwardly and downwardly across the cylinder 17. Adjacent the cylinder 17, the shroud is provided with depending side walls 19f which extend downwardly only as far as the top of the cylinder 17 and which permit air to circulate away from the cylinder 17. At the center of the shroud there is formed a dome-shaped portion 19g which encloses the air circulating fan 38. Supported on the top of the dome-shaped portion 19g is a starting mechanism 30 which is interconnected with the engine crankshaft 16 through the opening 39 in the shroud 19. The use of the rigid die cast shroud 19 makes it feasible to secure the starter mechanism 30 directly to the shroud itself rather than to the engine.

Rearwardly of the dome-shaped portion 19g the shroud has been shaped to form a gasoline tank or reservoir 31 for the engine 15. The portion of the shroud forming a part of the gasoline tank 31 is surrounded by side walls 19h which represent a continuation of the side walls 19f and by a rear wall 19i which completes the generally inverted cup-shaped configuration of the entire shroud 19. This cup-shaped configuration is somewhat irregular, defined by the front and rear walls 19c and 19i and the connecting side walls 19b, 19f and 19h. The general appearance of the shroud 19 is pleasing as a result of the smooth sloping surfaces of the side walls and the dome portion 19g. As has been explained above, the front opening 19d as well as the irregularities in the downward extension of the side walls 19f and 19h are a result of functional considerations and the necessity of having access to various parts of the engine 15.

In the instant embodiment, the shroud serves as an air conduit channeling air from the fan mounted within the dome-shaped portion 19g rearwardly across the cylinder 17. As the cooling air is directed downwardly by the shroud against the cylinder 17, it is allowed to escape or disperse due to the absence of enclosing shroud wall portions around the sides of the cylinder 17.

The gasoline tank 31 is defined in part by a recess or cup-shaped depression 19j which is cast integrally with the shroud 19. As may best be seen in FIGS. 2 and 3, the wall portions defining the cup-shaped depression 19j are positioned immediately within the volume defined by the side and rear walls 19h and 19i, respectively. The forward wall of the depression 19j is angled so as to direct the cooling air across the cylinder 17 in the manner described above. Extending upwardly from the bottom of the cup-shaped depression 19j is an integrally cast post member 19k. At one corner of the cup-shaped depression 19j, there is a secondary or deeper depression 19m which is intended to assure complete drainage of the fuel tank 31. As may be seen in FIG. 3, a fuel line 32 is connected to the fuel tank 31 at the bottom of the depression 19m. The depression 19m assures that, as the last quantity of gasoline is used in the fuel tank, there will be no intermittent feeding since any small residual quantity is confined in an area directly over the fuel line 32.

To cooperate with the cup-shaped depression 19j in the shroud 19 and complete the gasoline tank 31, a horizontal plate member 33 is positioned across the mouth of the depression 19j. At the top of the walls defining the depression 19j a ledge 19n is formed which extends around the mouth of the depression. The ledge 19n is of such a depth that the plate member 33 will be flush with the remainder of the shroud when placed in sealing engagement with the mouth of the depression or recess 19j. Extending around the horizontal face of the ledge 19n is a groove 19p within which an O-ring or sealing gasket 34 is received. The gasket extends above the ledge 19n into sealing engagement with the plate member 33.

The plate member 33 for the gasoline tank 31 is generally spherical in section with the concave portion facing downwardly toward the recess or depression 19j. The center portion of the plate member 33 is provided with a circular drawn depression 33a which may be termed the filling opening. The purpose of drawing the depression 33a rather than merely providing a filling opening therein is to create a simple and convenient means for assembling the closure plate 33 to the shroud 19. To permit gasoline or fuel to be placed in the tank 31, there are four radially spaced holes 33b positioned around the bottom of the depression 33a. At the center of the depression 33a and located centrally between the holes 33b, a hole is provided through which an assembly bolt 35 extends into threaded engagement with the top of the post member 19k. The plate member 33 is fabricated of steel having some resilience so that, as the assembly bolt is threaded into the post 19k, the periphery of the plate 33 is drawn into biased engagement with the ledge 19n and the sealing gasket 34 positioned therebetween.

To facilitate the pouring of gasoline into the filling opening 33a and to permit attachment of a cap or closure for the gasoline tank 31, a vertically extending filling tube or sleeve 36 is soldered to the plate member 33 extending coaxially upwardly from the depression 33a. The upper end of the filling tube 36 is formed with threads to receive the cap 37 which completes the enclosure forming the gasoline tank 31.

It should be appreciated that the placement of the assembly bolt 35 beneath the closure 37 provides a means whereby the plate member 33 may be readily assembled and disassembled from the shroud 19 while no sealing problems are involved as far as sealing against leakage of gasoline the hole through which the assembly bolt extends into engagement with the die cast shroud 19. Because of the physical properties of gasoline, it is very difficult to achieve leak proof joints and connections in a gasoline tank without resorting to soldered or brazed connections. It has been found, however, that the plate member and sealing gasket employed herein provide a simple and effective means of completing the reservoir enclosure.

It should be noted that there are a number of advantages resulting from the use of a die cast aluminum shroud and the mode in which it has been integrated with the engine structure in the embodiment described above. The noise and vibration problems associated with enclosing an engine have been discussed above. The rigid properties of the die cast shroud completely eliminate this problem. In addition, by employing a shroud which may structurally support the other elements normally associated with the engine, the possibility of vibration noise being produced between these elements and the shroud is reduced. Thus with the starter mechanism secured directly to the shroud and with the elimination of the sheet metal gasoline tank, there are fewer parts which might produce noise through vibrating engagement.

The integration of the gasoline tank with the shroud also results in economies in the labor involved in assembling the engine and in the material by reducing the number of parts required. These economies make the use of a die cast shroud feasible from a cost standpoint.

While a particular embodiment of the invention has been shown, it will be understood, of course, that the invention is not limited thereto, since many modifications may be made and it is, therefore, contemplated by the appended claims to cover any such modifications as fall within the true spirit and scope of the present invention.

What is claimed as new and desired to be secured by Letters Patent of the United States is:

1. A combined fuel reservoir and shroud for an internal combustion engine comprising a die cast shroud having side walls and a top wall for partially enclosing an engine, assembly means for securing said shroud to said engine, an upwardly facing depression cast in the top wall of said shroud, fluid conduit means connected to the bottom of said depression, a plate member positioned across said depression to form a liquid tight chamber therein, a filling opening in said plate member provided with a cap removably secured to said plate in obstructing relation to said opening, and assembly means retaining said plate in sealed engagement with said shroud, said assembly means being insertable into said filling opening for engagement with said shroud and being positioned entirely within said chamber beneath said cap.

2. An internal combustion engine comprising a cylinder, a crankcase connected to said cylinder, a cup-shaped shroud having downwardly extending side walls and covering said cylinder and crankcase, bracket means securing said shroud to said cylinder and crank case, a downwardly extending depression near one edge of said shroud, plate means closing the top of said depression to form a gasoline reservoir integrally with said shroud, a filling opening formed in said plate means removable cap means closing said filling opening a removable plate secured to said shroud in obstructing relation to an opening in one of said side walls, and an oil filling opening in said crankcase in alignment with said side wall opening.

3. A die cast gasoline tank for an internal combustion engine comprising a cup-shaped casting, said casting including an assembly post extending upwardly from the bottom of said cup-shaped casting, a plate member closing the mouth of said cup-shaped casting, assembly means extending through said plate member into engagement with the top of said post to retain said plate in sealed engagement with the portion of said casting defining the mouth of said cup-shaped casting, a filling opening for said tank in said plate member in alignment with said assembly means, a threaded cap, and means provided in said filling opening for threadedly receiving said cap to close said filling opening, said assembly means being positioned beneath said cap and insertable in said filling opening for engagement with said post entirely within said reservoir.

4. A gasoline tank for an internal combustion engine comprising a cup-shaped liquid receiving member having an upwardly facing mouth defined by a horizontal lip portion, a groove in said lip extending around the periphery thereof, gasket means received in said groove, a plate member extending across said mouth and positioned in engagement with said gasket, a filling opening formed in said plate member, assembly means positioned in said filling opening and extending into said engagement with said liquid receiving member to retain said plate member in sealing engagement with said gasket, and a removable closure for said filling opening enclosing said assembly means completely within said tank.

5. The gasoline tank as set forth in claim 4 wherein said filling opening comprises a depressed cup-shaped portion in said plate member, a plurality of holes formed in the bottom of said depressed portion, said assembly means extending through said depressed portion to retain said plate member assembled to said cup-shaped liquid receiving member.

6. A gasoline tank as set forth in claim 5 including a filling tube secured to said plate member extending upwardly from said depressed portion, said closure being threadedly received on the upper end of said tube to close said filling opening.

7. An internal combustion engine comprising a body portion including at least one cylinder and a crankcase, a one-piece shroud partially enclosing said body portion, said shroud being secured to said body portion to direct cooling air circulated by said engine across said cylinder, an upwardly facing depression formed integrally with said shroud, a plate member positioned across said depression to form a liquid tight fuel reservoir therein, said plate member having a depressed cup-shaped portion with holes in the bottom thereof forming a filling opening, closure means for said filling opening removably secured to said plate member, assembly means extending through said depressed portion to retain said plate assembled to said shroud, and liquid conduit means extending from said fuel reservoir to said cylinder.

8. An internal combustion engine comprising an air cooled cylinder portion, a crankcase portion connected to said cylinder portion and having a crankshaft extending outwardly therefrom, a one-piece die cast shroud partially enclosing said engine portions, an air circulating fan carried by said crankshaft and positioned between said shroud and said engine portions, assembly means securing said shroud directly to said engine portions, engine starter means structurally supported by said shroud on the exterior thereof and drivingly connected to said crankshaft, an upwardly facing recess formed in said shroud, a substantially flat plate member secured across the mouth of said recess to form a liquid tight fuel reservoir, and a fuel conduit connected to the bottom of said recess to supply fuel to said engine.

9. The internal combustion engine as set forth in claim 2, having a crankshaft extending upwardly through an opening in said shroud and an engine starter means structurally supported by said shroud on the exterior thereof and drivingly connected to said crankshaft.

References Cited in the file of this patent

UNITED STATES PATENTS

| | | |
|---|---|---|
| 255,789 | Irving | Apr. 4, 1882 |
| 472,910 | Ryder | Apr. 12, 1892 |
| 1,733,361 | Rice | Oct. 29, 1929 |
| 2,346,148 | Bosma | Apr. 11, 1944 |
| 2,480,879 | Rice | Sept. 6, 1949 |
| 2,501,470 | Krueger et al. | Mar. 21, 1950 |